*US008931282B2*

United States Patent
Feinstein (10) Patent No.: US 8,931,282 B2
(45) Date of Patent: Jan. 13, 2015

(54) INTERNAL COMBUSTION ENGINE

(76) Inventor: Jonathan Jay Feinstein, North Salem, NY (US)

(*) Notice: Subject to any disclaimer, the term of this patent is extended or adjusted under 35 U.S.C. 154(b) by 0 days.

(21) Appl. No.: 13/438,056

(22) Filed: Apr. 3, 2012

(65) Prior Publication Data

US 2012/0186221 A1 Jul. 26, 2012

Related U.S. Application Data

(63) Continuation of application No. 13/304,059, filed on Nov. 23, 2011, which is a continuation of application No. PCT/US2010/001601, filed on Jun. 2, 2010.

(60) Provisional application No. 61/217,929, filed on Jun. 4, 2009.

(51) Int. Cl.
*F02C 3/30* (2006.01)
*F02G 3/00* (2006.01)
(Continued)

(52) U.S. Cl.
CPC .............. *F02M 25/022* (2013.01); *F02C 3/113* (2013.01); *F02C 3/165* (2013.01); *F02C 7/10* (2013.01);
(Continued)

(58) Field of Classification Search
CPC .............. F02C 3/04; F02C 3/055; F02C 3/30; F02C 5/06; F02D 15/00; F02D 15/02; F02G 1/00; F02G 3/00; F02G 2242/40; F02G 2243/30; F02B 33/36
USPC ............ 60/39.182, 39.54, 39.55, 39.58, 69.6, 60/727, 735, 736, 39.281, 729, 737, 740, 60/746, 775
See application file for complete search history.

(56) References Cited

U.S. PATENT DOCUMENTS 4,171,612 A * 10/1979 Zwick .......................... 60/39.23
4,197,700 A * 4/1980 Jahnig ............................ 60/774
(Continued)

FOREIGN PATENT DOCUMENTS

JP 2007-138715 A 6/2007

OTHER PUBLICATIONS

International Preliminary Report on Patentability issued Dec. 6, 2011 in related International Appln. No. PCT/US2010/00161 (1 page).
(Continued)

*Primary Examiner* — Phutthiwat Wongwian
*Assistant Examiner* — Arun Goyal
(74) *Attorney, Agent, or Firm* — Lucas & Mercanti LLP; Robert P. Michal (57) ABSTRACT

An internal combustion engine in which the power output is controlled by modulating at least one of the compression ratio, expansion ratio, ratio of expansion rate to compression rate, air to fuel ratio, and steam to air ratio. Continuous isobaric catalytic combustion followed by isothermal expansion and the use of separate compressor and expander devices are used. Control dynamically maximizes fuel efficiency for the given power demand conditions. Power output is controlled by modulating flame temperature and/or pressure instead of by throttling. Lean combustion, high compression ratio, exhaust heat recuperation, and high power density and fuel economy are provided. External cooling is minimized or eliminated. Insulation of the engine effectively reduces energy losses to friction. Interchangeable use of gasoline, hydrogen and ammonia at high fuel efficiency is made possible for transitional periods of fuel availabilities. An injector suitable for isothermal expansion is provided.

24 Claims, 2 Drawing Sheets

(51) Int. Cl.
- *F02M 25/022* (2006.01)
- *F02C 3/113* (2006.01)
- *F02C 3/16* (2006.01)
- *F02C 7/10* (2006.01)
- *F02B 21/02* (2006.01)
- *F02D 13/06* (2006.01)
- *F02D 15/00* (2006.01)
- *F02M 25/07* (2006.01)
- *F02C 6/16* (2006.01)

(52) U.S. Cl.
CPC ............... *F02B 21/02* (2013.01); *F02D 13/06* (2013.01); *F02D 15/00* (2013.01); *F02M 25/0709* (2013.01); *Y02T 10/121* (2013.01); *F02C 3/305* (2013.01); *F02C 6/16* (2013.01)
USPC ............ 60/775; 60/39.55; 60/39.58; 60/729; 60/735

(56) References Cited

U.S. PATENT DOCUMENTS

| | | | | |
|---|---|---|---|---|
| 4,333,424 | A * | 6/1982 | McFee | ............ 123/39 |
| 4,653,269 | A | 3/1987 | Johnson | |
| 5,337,554 | A | 8/1994 | Bertels | |
| 5,894,729 | A | 4/1999 | Proeschel | |
| 5,934,063 | A * | 8/1999 | Nakhamkin | ............ 60/773 |
| 6,092,365 | A | 7/2000 | Leidel | |
| 6,289,666 | B1 * | 9/2001 | Ginter | ............ 60/775 |
| 6,314,925 | B1 | 11/2001 | Britton | |
| 6,606,860 | B2 * | 8/2003 | McFarland | ............ 60/648 |
| 6,722,132 | B2 * | 4/2004 | Stuttaford et al. | ............ 60/737 |
| 6,755,022 | B2 * | 6/2004 | Kim et al. | ............ 60/608 |
| 7,654,330 | B2 * | 2/2010 | Zubrin et al. | ............ 166/369 |
| 7,827,794 | B1 * | 11/2010 | Pronske et al. | ............ 60/728 |
| 8,261,550 | B2 * | 9/2012 | Sartre | ............ 60/607 |
| 2004/0003781 | A1 | 1/2004 | Yuki et al. | |
| 2005/0257523 | A1 | 11/2005 | Proeschel | |
| 2007/0022977 | A1 | 2/2007 | Crower | |
| 2008/0202454 | A1 * | 8/2008 | Pirault | ............ 123/58.8 |
| 2009/0126668 | A1 | 5/2009 | Shiraishi et al. | |

OTHER PUBLICATIONS

International Search Report mailed Jan. 10, 2011 issued in related International Appln. No. PCT/2010/001601 (2 pages).

Written Opinion of the International Searching Authority mailed Jan. 10, 2011 in related International Appln No. PCT/US2010/00161 (3 pages).

Canadian Office Action dated Mar. 22, 2013 issued in related Canadian Patent Application No. 2,762,599 (4 pages).

Communication from European Patent Office dated Aug. 12, 2013 re Appln. No./Patent No. 10783703.1-1610/2438278 PCT/US2010000601.

Canadian Office related Canadian Application Action dated Oct. 8, 2.014 which was issued in a No. 2,763,599 (3 pages).

* cited by examiner

INTERNAL COMBUSTION ENGINE

CROSS-REFERENCE TO RELATED APPLICATIONS

This is a Continuation of pending U.S. application Ser. No. 13/304,059 filed Nov. 23, 2011, which in turn is a Continuation of PCT International Application PCT/US2010/001601 filed Jun. 2, 2010, which in turn claims benefit to U.S. Provisional Application No. 61/217,929 filed Jun. 4, 2009, the entire disclosure of each of which is incorporated herein by reference.

FIELD OF INVENTION

This invention pertains to internal combustion engines and the generation of power from such engines.

DEFINITIONS

Air is defined herein as a generalized term referring to the working fluid containing oxygen atoms as oxidant or the products of combustion associated with an ICE, whether alone or in admixture with steam injections. Exhaust air refers to air exiting the ICE.

The air to fuel ratio or A/F ratio is defined herein as the mass ratio of oxidant to fuel mixed for combustion in an ICE.

The chamber is defined as the composite volume or containment of compressed gas between the compressor and expander comprising conduits, a preferred heat exchanger, and a combustion chamber.

A compressor is any device used to increase the pressure of air, including, but not limited to, single acting and double acting cylinders, rotating screw, lobe, or gerator type compressors, centrifugal compressors and the like.

The compression rate or CR is defined as the change in volume of the compressor in communication with the chamber during the time the compressor is in communication with the chamber in one cycle divided by the cycle time.

CVT refers to a continuously variable transmission as is known in the art by which the ratio of the revolutions per minute or rpm's of two shafts is dynamically altered.

Cycle time is defined as the time between the starts of consecutive like processes of the compressor, expander, or engine, depending on the context.

The E/C ratio is the ER divided by the CR.

An expander is any device used to decrease the pressure of air within a container, including but not limited to, single acting and double acting pistons, lobe, gerator, or rotating screw types, turbines, and the like.

The rate of expansion or ER is defined as the change in volume of the expander in communication with the chamber during the time that the expander is in communication with the chamber in one cycle divided by the cycle time.

$H_2O$ is defined herein as that compound of hydrogen and oxygen in liquid or in gaseous state. $H_2O$, water and steam are used as examples of liquids that may be substantially converted from liquid to gaseous state in a compressor, heat exchanger, combustion chamber, or expander as taught in the invention.

ICE means internal combustion engine.

Injection refers to the addition of a fluid such as fuel or water into air or another fluid regardless of the method of addition and includes aspiration, spraying methods and the like.

The peak temperature and the flame temperature are both defined herein as the highest temperature of the air during a cycle of the ICE. This temperature is normally reached during combustion and may survive expansion in the case of isothermal expansion.

The steam to air ratio or S/A ratio is defined herein as the mass of $H_2O$ injected into air or fuel in an ICE divided by the mass of air compressed in the compressor of an ICE in similar time periods or integers of cycles.

Steam is defined herein as $H_2O$ in the gaseous state.

Water is defined herein as $H_2O$ in the liquid state.

PRIOR ART

Cooling the compressed combustion air by indirect heat exchange against water or ambient air between stages of compression to lower the energy input required for a given amount of compression in an ICE is known. Similarly, cooling air in an ICE during compression by direct water injection and evaporation is also known. Water evaporation in the compressor increases the moles of gas to be expanded. Expansion of the increased moles of gas is not fully exploited in engines of fixed E/C ratios. For example, the E/C ratio that fully expands the air for given conditions without water injection, under-expands the air with the addition of water injection and evaporation, resulting in loss of energy efficiency. The exhaust with water injection then performs work on the environment instead of performing useful work within the ICE.

Water injection and evaporation of the water in a combustor or expander of an ICE to increase the volume and/or decrease the temperature of the gas being expanded is known. Because this method has been employed in ICE's of fixed E/C ratio, substantial benefit to fuel efficiency of variable water injection into the combustor or expander is not realized.

US Patent application 2007/00229977 discloses the injection and evaporation of water in a cylinder of a spark ignition engine. The six stroke configuration includes an air intake stroke, an air compression stroke, ignition and a power stroke, an exhaust stroke, an additional stroke powered by water injection and evaporation, and a second exhaust stroke. Neither dynamic adjustment of the A/F ratio nor of the E/C ratio is taught. This art represents another form of water injection to increase the ratio of expansion work performed to compression work absorbed, but at a fixed E/C ratio, such that the full potential advantages of no water injection and varying amounts of water injection are not realized.

ICE's with compression and expansion in a dedicated or separate compressor and expander, respectively, are also known. Isolation of the compressor from the expander by means of a clutch and isolation of an air storage device between the compressor and expander from the compressor or expander by means of valves is known.

Use of a CVT is known for transmitting turning power from an engine to a power load such as a wheel on a car. U.S. Pat. No. 6,092,365 teaches away from the use of a CVT for linking compressor and expander devices. Recuperation of exhaust gas sensible heat to combustion intake air is also taught in that patent.

Total deactivation of a moving cylinder is known whereby all the valves in the cylinder are held closed throughout its entire cycle and air in the cylinder is alternately adiabatically compressed and adiabatically expanded at a nearly zero net import or export of power from the cylinder apart from friction losses.

Catalytic combustion is known for lowering the temperature or reducing the time in which fuel and an oxidant react. Catalytic combustion is useful for burning lean A/F ratios that would not otherwise combust in a prescribed period of time at a given operating temperature, but cannot be practiced in engine compartments also used as positive displacement compressors or expanders because such components contain insufficient space for useful catalyst surface area. Catalytic combustion is disclosed in the patents and published literature of Precision Combustion, Inc. of Connecticut, USA.

Recuperation in which the sensible heat of exhaust air indirectly and counter currently heats the compressed air from a compressor prior to expansion of the air within an ICE is known.

Use of separate cylinders for compressing and expanding air in a positive displacement engine is disclosed in U.S. Pat. Nos. 4,653,269 and 6,092,365. These patents disclose the storage of energy as compressed air and the subsequent consumption of that stored energy. U.S. Pat. No. 4,653,269 discloses the use of a clutch to disengage the compressor while the expander expands stored, compressed air and transmits its work to a load, or alternatively to disengage the external load while work from the expander is used to compress and store compressed air for future use. In a third mode of operation, the compressor, expander, and external load may all be engaged for balanced power creation and use by the external load.

U.S. Pat. No. 6,092,365 discloses the use of valve timing to deactivate the compressor while the expander expands stored compressed air. At other times, the compressor can be selectively activated.

Partial deactivation of moving cylinders by means of valve timing alterations is known. This is often accomplished by sliding the camshaft longitudinally or otherwise altering the relationship or displacement between the camshaft and the valve stems. Camless or electronic actuation of the valves is also known to provide partial or complete deactivation of a reciprocating compressor.

OBJECTIVES

It is an overall objective of the present invention to increase the thermal efficiency of an ICE without adding peripheral power plants or other external devices such as external combustion engines or compressors.

It is also an objective to enable ICE's to utilize relatively high compression ratios and/or use low octane fuels without knocking.

It is a further objective to enable ICE's to utilize slow burning fuels or fuel/air mixtures at high power density.

It is additionally an objective to reduce or eliminate energy dissipation devices and methods in ICE's such as air and water cooling.

It is yet a further objective to increase the amount of expansion work performed by an ICE without a corresponding increase in the peak temperature of the air as in adiabatic expansion.

It is also an objective to store energy to increase both the power density and thermal efficiency of an ICE.

It is additionally an objective to modulate the power output of an ICE at a lower cost to its efficiency than is accomplished by throttling methods.

It is a further objective to provide an ICE that can interchangeably use hydrocarbon, hydrogen, and ammonia fuels at high thermal efficiency during transition periods to alternate fuel distribution infrastructures.

It is also an objective to provide an ICE that responds dynamically to changes in fuel type or fuel mixture to provide the appropriate amount of power at optimal fuel efficiency.

Other objectives will become clear to one reasonably skilled in the art upon reading the following description.

DESCRIPTION OF THE INVENTION

All descriptions herein disclose various exemplary embodiments and features of the invention. These exemplary embodiments and features are not meant to be limiting.

Quasi-Isothermal Compression

For power generation that experiences wide or rapid changes of power demand, compression is preferably performed in a positive displacement compressor such as one of a single or double acting reciprocating compressor, lobe, gerator, or rotating screw compressor, and most preferably using a lobe, gerator, or rotating screw compressor. For substantially steady state power generation centrifugal compressors are preferred. Compression may be via one or more compressors working in series or in parallel.

Prior to induction into the compressor or within the compressor, induction air is mixed with atomized water such as by spraying the water into the air by a suitable water atomizing nozzle. As the mixture of air and liquid water of high surface area droplets is compressed, preferably adiabatically, the air is heated, causing at least some of the water to vaporize and thereby moderate the temperature rise of the air-water mixture. The amount of atomized water added to the air is preferably metered so as to at least equal the amount of water that vaporizes into the air in the compression process.

The atomized water is preferably of fine enough droplet size to remain in suspension during compression and to evaporate as close to reversible conditions as possible. Droplets of 10 micron are sometimes used in Wet Low NOx technology in which a water fog is injected into the compressor of a gas turbine to reduce NOx emissions. As the air is cooled by evaporation, the work required for subsequent compression is reduced, the energy is retained in the system, and additional compressed working fluid volume is created.

The lobe, gerator, or rotary screw compressor may optionally be flooded with water to seal the gaps between the respective compression surfaces. The water used for spraying or flooding in the compressor is preferably recirculated from the water flooding that exits the compressor with the compressed air and is preferably not cooled by intentional heat exchange with the environment. The lobe, gerator, or rotary screw compressor may use foil or magnetic bearings where high rates of compression are desired.

Water may be evaporated alternatively or additionally in saturators between stages of compression. The compression-heated air may bubble through the water to saturate the air with water vapor.

Adjustment of Compression or Expansion Ratio

In one embodiment of the invention, the compression ratio of the positive displacement compressor is increased by adding water to the induction air, which water also exits the compressor as liquid water along with the compressed air, thereby reducing the volume of air entering and exiting the compressor relative to the compressor inlet and outlet volumes, respectively, and thereby increasing the volume compression ratio of the compressor for air compression. The excess water addition thereby increases the pressure of the air exiting the compressor. The water used to increase the compression ratio of the compressor is preferably recirculated and not intentionally cooled.

By way of example, a compressor with a volume compression ratio of 10 to 1 inducts a mixture of 95% air and 5% water by volume, whereby the volume compression ratio for the air is raised to about 9.5 to 0.5 or 19 to 1.

Another method for adjusting the compression ratio or the expansion ratio is to dynamically connect or disconnect multiple compressors or expanders, respectively, in series. In this method, gas may be compressed by a variable number of compressors or expanded by a variable number of expanders. For example, a second compressor in series with a first compressor may be used to increase the pressure of compressed gas and hence the power density of the engine when higher power loading is demanded, and the second compressor bypassed by use of shut off or three way valves at other times.

In another example, a turbine may be connected in series downstream of a first expander to accommodate higher pressure gas in the combustion chamber, and the turbine may be bypassed by use of shut off or three way valves at times when the turbine is not necessary to fully expand the gas.

Another method for adjusting the compression ratio or the expansion ratio is to utilize lobe, gerator, or rotating screw compressors or expanders with variable port openings at their inlet or outlet as is known in the art.

Adjustment of the Rate of Expansion to the Rate of Compression

In the present invention, it is desired to expand air to a prescribed pressure for a variety of conditions in which adjustments of the E/C ratio are necessary. As an example, if the absolute temperature of the air exiting the chamber or exiting the expander divided by the absolute temperature of the air exiting the compressor is changed, it is necessary to change also the E/C ratio to expand the air to the prescribed outlet pressure. As another example, if the number of moles of air exiting the chamber or exiting the expander divided by the number of moles of air entering the chamber changes, it is necessary to alter also the E/C ratio to expand the air to the prescribed outlet pressure. Examples of molar changes include changes in A/F ratio, changes in fuel type or content, and changes in the S/A ratio. Hence alteration of the E/C ratio is an important form of control for engine thermal efficiency at all times and to make an engine suitable for use with a variety of fuels.

It is preferred for both the compressor and expander to be positive displacement devices for applications in which the power demanded varies substantially and often such as in automotive applications. The compressor introduces a volume of air into the chamber at a prescribed compression rate or CR. The expander withdraws a volume from the chamber at a prescribed expansion rate or ER. The CR and ER are independently adjusted with respect to each other to alter the E/C ratio.

Adjustment of the E/C ratio may be accomplished in a variety of ways within the scope of the present invention. In the embodiment in which either a reciprocating compressor or a reciprocating expander is used, the timing of the valves in the reciprocating device may be altered to effect a different ER or CR for a given rpm of either respective device.

Yet another embodiment is to link the compressor and expander with a CVT, with one or more clutches, with hydraulics, or with a gear box type transmission. The preferred method of altering the E/C ratio is a CVT.

In an embodiment in which the temperature and number of moles of the gas entering the chamber is substantially the same as the temperature and number of moles of the gas exiting the chamber, it is preferred that the engine be operated at an E/C ratio substantially near unity for the highest percentage of the engine's operating time as possible. In an embodiment in which combustion is performed within the chamber such that the temperature of the gas in the chamber is higher than the temperature of the gas exiting the compressor, the E/C ratio is adjusted to the absolute temperature of the gas exiting the chamber divided by the absolute temperature of the gas exiting the compressor. The E/C ratio may be adjusted to fully expand gas that is heated to different temperatures or in which the number of moles of compressed air changes relative to the number of moles of air expanded by virtue of changes in fuel or water injection into the chamber, A/F ratio, fuel type, or mixture of fuels. For each of these adjustments, the E/C ratio is preferably such that air is neither compressed nor expanded upon exiting the compressor and entering the chamber. The adjustment of the E/C ratio may be used in place of or to complement the above described adjustments of compression ratio or expansion ratio to attain full or otherwise optimal expansion of the exhaust gas for varying or dynamically altered criteria of fuel efficiency and power density with respect to power demand and other instantaneous engine operating conditions.

Isobaric Expansion Via Heat Exchange

The compressed gas, preferably humidified air, optionally passes through a gas/liquid phase separator to remove water from the humidified air before the air enters a preferred heat exchanger. The separator is especially useful if the compressor is water flooded or if water is used to modulate the compression ratio.

The heat exchanger preferably heats at least some, and preferably all, of the compressed gas countercurrently against at least some, and preferably all, of the outlet gas from an expander and preferably from the last expander. The heat exchanger may be of any type, including plate or shell and tube configurations. The design and selection of heat exchanger configurations for given applications such as this one are known to those reasonably skilled in the art.

Fuel is added to the air in the combustion chamber and/or in the expander, causing the thermal mass of the gas exiting the expander to be greater than the thermal mass of the compressed gas entering the chamber. Water may be added to the compressed air to vaporize the water endothermically to absorb more heat from the expanded gas and thereby provide greater heat recovery. For greatest fuel economy, the amount of water added to the compressed air is preferably the amount that lowers the temperature of the expanded gas exiting the heat exchanger as much as possible without lowering the temperature of the compressed gas exiting the heat exchanger. The addition of more than this preferred amount of water to the compressed gas prior to or in the heat exchanger may be used to increase the expansion and power density of the engine at the expense of fuel efficiency. In such larger additions of water than is optimal for fuel efficiency, the amount of water is balanced with additional fuel injection in the heat exchanger or expander for a given amount of induction air to maintain the desired expansion temperature. The practical limit for such elevated additions of water and fuel for reasonable fuel efficiency is the level at which the fuel consumes all the oxygen present in the compressed and expanded gas. Above this limit of water addition, the flame temperature is further diluted and losses in fuel efficiency become more precipitous.

Isobaric Expansion Via Combustion Heating

Compressed air exiting the compressor or preferably exiting an optional heat exchanger downstream of the compressor is isobarically heated by concurrently expanding and reacting it with a fuel. Suitable fuels include, but are not limited to, hydrocarbons, carbon monoxide, hydrogen and its derivatives including ammonia, and other fuels that are liquid or gaseous at ambient temperatures.

Fuel is injected into the oxidant in a specific combustion chamber portion of the collectively referred to chamber. The combustion chamber may contain a catalyst suitable for increasing the rate of the reaction of the fuel and oxidant. The flame temperature in the combustion chamber is preferably modulated by adjusting the amount of fuel injected relative to the amount of oxidant compressed to provide varying substoichiometric ratios of fuel in combination with the oxidant. The flame temperature is preferably limited to a lean fuel combustion temperature compatible with the materials of construction of the engine, and preferably to this said temperature without intentionally cooling the gas or engine by heat exchange between the engine or its contents and the environment. The maximum flame temperature in the chamber is less than 900° C.

In one embodiment, when high power is demanded the fuel injection is increased for short periods of time to effectively lower the A/F ratio and provide temperatures above those generally desirable for long engine service life. The time-temperature profile of this higher temperature excursion is limited to a cumulative level to provide acceptable engine service life. The acceptable engine life may be prescribed by the operator, such that both higher peak power and efficiency may be selected by the operator at the expense of shorter engine life. The engine control system may select low temperature excursions below the normally prescribed flame temperature when power demand is reduced following high temperature excursions above the normally prescribed flame temperature to return the engine more quickly to its lower, more customary operating temperature to prolong engine life.

In another embodiment, increased fuel injection is accompanied with the injection of water. In this embodiment, the water injection and evaporation are increased to effectively suppress the combustion temperature while the A/F ratio is reduced to oxidize more of the oxygen in the oxidant to provide incremental steam and combustion products to expand at temperatures compatible with relatively long service life of the engine's lubricants and materials of construction.

The fuel and water additions in the combustion chamber may be controlled by closed loop controller based on the combustion chamber temperature and/or prescribed ratios of A/F and steam to air ratio for given conditions of power demand, rpm, fuel selection, ambient temperature and humidity, exhaust gas recirculation, chamber pressure, E/C ratio, and the like.

Isothermal Expansion in Expander

The gas, preferably combustion heated to a prescribed expansion temperature in the combustion chamber, is inducted into the expander wherein it is expanded substantially isothermally via the concurrent injection of fuel into the expander to react with the oxidant. The fuel may be injected in one or more locations within the expander. For example, the fuel may be injected into a rotary screw expander through one or more ports in the expander's casing.

The amount, location, and manner of fuel injected in the expander preferably provide a uniform temperature throughout the expander expansion process and an expander outlet temperature substantially equal to the expander inlet temperature. The fuel injection in the expander may be controlled by closed loop control of the expander outlet gas temperature and/or to prescribed amounts based on engine operating conditions and the power demand at a given time.

The fuel is preferably injected in gaseous form at a pressure exceeding that of the expander. The fuel injected may be mixed with steam or water.

Fuel Injection

To inject fuel into an oxidant in an internal combustion engine, especially a non-cooled or thermally insulated internal combustion engine, without local melting or oxidation of the injector, an injector consisting of two concentric tubes is used. Fuel is injected through the inner tube, and a shroud gas is injected through the annulus between the two tubes. The shroud gas contains little or no oxidant, fuel, or species that readily react with the fuel or oxidant. The shroud gas may be stream or recirculated exhaust gas substantially depleted of oxygen, fuel and partially oxidized fuel species, such as hydrogen or carbon monoxide. The flow rate of the shroud gas is established by the width of the annulus and the supply pressure of the shroud gas to the annulus. The flow rate of the shroud gas is preferably the lowest flow suitable to provide conditions compatible with acceptable injector life. Those conditions may be empirically ascertained for various operating conditions.

The injector may alternatively be constructed of a single tube of sufficient heat and oxidation resistance as to provide acceptable injector life. Suitable materials include refractories or ceramics and high temperature metal alloys, such as Inconel alloys or exhaust valve steels.

Cooling in Heat Exchanger

The air exiting the last expander is cooled in a preferably countercurrent heat exchanger against the compressed air. The expanded and cooled gas is then exhausted from the engine. The expanded air is preferably cooled to as low a temperature as possible. The expanded air may be additionally cooled against fuel or a mixture of fuel and $H_2O$, preferably countercurrently, in the oxidant heat exchanger described above or in an additional fuel heat exchanger in series with or in parallel with the oxidant heat exchanger.

Embodiments with Liquid Fuels

One embodiment incorporates the use of a fuel with a boiling temperature of less than 700° C. at 1 bar pressure. Illustrative fuels include, but are not limited to, gasoline, diesel, kerosene, and ammonia. In this embodiment, the fuel's heat of vaporization is provided to the fuel in a fuel heat exchanger against air exiting the expander or oxidant heat exchanger. The fuel heat exchanger may be within the oxidant heat exchanger or may be a separate heat exchanger in series with or in parallel to the oxidant heat exchanger. The fuel is preferably heated in a separate stream from the oxidant, and is not combined with the oxidant until it reaches the combustion chamber.

This embodiment of fuel evaporation and heating is illustrated with ammonia fuel as an example. Ammonia fuel is preferably stored in liquid state under pressure, such as in a storage container suitable for containing ammonia at a pressure of up to about 20 bar. At an ambient temperature of 25° C., the ammonia boils until the pressure within the storage container reaches about 10 bar. Liquid ammonia fuel is pumped from the storage container to an elevated pressure via pumping means and then conveyed to a heat exchanger in which the ammonia is heated and evaporated against at least some of the gas preferably exiting the last expander or oxidant heat exchanger. For the illustrative pressure of 113 bar, the critical pressure of ammonia, the ammonia is heated at least to its critical temperature of 132° C. in the fuel heat exchanger.

In embodiments where hydrocarbon fuels are used, the fuel is preheated to temperatures below those at which they crack or precipitate carbon deposits. The fuel may be reformed into a mixture containing at least hydrogen and one or more oxides of carbon via the steam reforming process, also known as the steam methane reforming process, within the engine. The steam methane reforming process is well taught in the literature, and provides additional expansion of reactant gas molecules into a higher number of product gas molecules.

In one embodiment, the fuel is expanded in a fuel expander, such as a turbo expander or a positive displacement expander, to a pressure less than 2 bar higher than that of the chamber and is then injected to combust with the compressed oxidant in at least one of the chamber or the oxidant expander.

In another embodiment, the fuel is injected into at least one of the combustion chamber or the air expander at substantially the same pressure it is under in the fuel heat exchanger and substantially higher than that in the vessel in which it is mixed with oxidant.

In another embodiment, water is added to evaporated ammonia fuel at elevated pressure in a heat exchanger before the ammonia is combined with the oxidant such that the heat exchanger in which the ammonia is heated contains a mixture of ammonia and water being heated against expanded air. In an example in which the mixture of water and ammonia is heated to 200° C. in a heat exchanger, the ammonia evaporates until the gas phase contains the critical partial pressure of ammonia of 113 bar and the water evaporates until the gas phase contains a partial pressure of 16 bar steam, resulting in a mixture of about 88% ammonia and 12% steam by volume at a total pressure of about 129 bar. Both the ammonia and water are pumped to this pressure of 129 bar prior to mixing them. The heated gaseous mixture of ammonia and steam is transferred from the heat exchanger and is injected into at least one of the chamber or an expander at a pressure of about 129 bar. In one embodiment, the pressure of the chamber or expander in which the ammonia and steam are injected is substantially less than 129 bar, and the higher pressure mixture of injected ammonia and steam performs work on the gas within the chamber, within the expander, or in both.

In another embodiment, the mixture of oxidant and steam is compressed to a pressure less than 2 bar below the pressure of the mixture of ammonia and steam from the fuel heat exchanger, and little work is performed by the mixture of ammonia and steam on the gas in the chamber or expander. It is preferred to inject the fuel and steam into the oxidant at the pressure that provides the combination of steam saturation and temperature that extracts the most heat from the exhaust air per unit of work performed by the ICE.

Exhaust Gas Recirculation

In another embodiment, the exhaust gas downstream of the expander and heat exchanger is recirculated to the air compressor inlet to constitute part of the oxidant induction stream, thereby lowering the oxygen content and raising the steam content of the induction oxidant stream. In this embodiment, the dew point temperature for steam condensation is raised relative to operation of the engine without exhaust gas recirculation, abbreviated EGR. The higher dew point is used to condense steam from the exhaust gas stream for use as a water additive in the engine.

In yet another embodiment, a carbonless fuel is used and EGR is employed to cause the A/F ratio to be substantially stoichiometric or substoichiometric in oxygen for combustion. The portion of the exhaust gas that is not recirculated essentially contains $H_2O$ and nitrogen. The nitrogen is separated from the $H_2O$ by distillation. The separated nitrogen is sold, used for a purpose, or is further purified for use or for sale. If substoichiometric oxygen is combusted in the engine, the remaining fuel is removed by the addition of and reaction with an oxidant such as oxygen or air.

Ignition

The fuel and air mixture is ignited in the combustion chamber on startup by means of an electric device such as an electrical resistant heating element, spark plug, or the like providing a high temperature source of heat suitable for igniting the fuel and air mixture. Upon light-off or activation of the combustion catalyst, electric heating of the air and fuel may be discontinued. Combustion catalysts are known to those skilled in the art and may use platinum group metals such as Pt, Pd, Rh and combinations thereof as the active metal. The metal is supported on a suitable support material such as coated on a substrate of suitable geometric surface area. The electrical resistance heating element may be incorporated into the catalytic reactor, such as in a metal foil substrate through which a current is drawn as is known by those skilled in the art and as are supplied by Emitec of Germany.

DETAILED DESCRIPTION OF THE DRAWINGS

Figure 1:
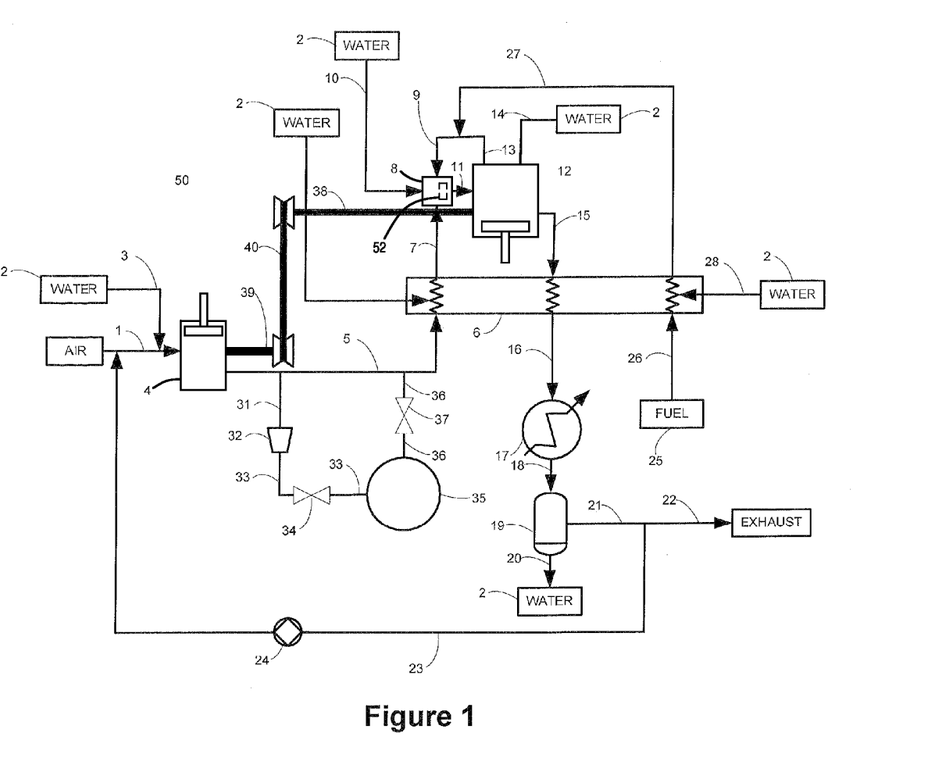
FIG. 1 is a schematic representation of the present invention.

Referring to FIG. 1 depicting engine 50, air is supplied via line 1 and water is supplied from reservoir 2 via line 3 to compressor 4 wherein the mixture of air and water are compressed and wherein at least some of the water evaporates. Compressed and humidified air exits compressor 4 via line 5 which conveys the air to indirect heat exchanger 6 in which the air is heated, preferably counter-currently, against air exiting expander 12. Water from reservoir 2 is conveyed via a line (not numbered) into the compressed air into heat exchanger 6.

Compressed and preheated air is conveyed via line 7 from the heat exchanger to combustion chamber 8, wherein the air is mixed and combusted with fuel introduced to the combustion chamber via line 9. The combustion chamber contains an electrical heating element, not shown, to ignite the mixture of fuel and air and a combustion catalytic reactor (52), to maintain stable flame condition. Water from reservoir 2 is introduced to the chamber via line 10. Line 11 conveys the compressed and combustion heated air from the combustion chamber to the expander 12, wherein the air is expanded. Fuel is added to the expander via line 13 and combusts with air in the expander to heat the air and provide substantially isothermal expansion such that the outlet and inlet temperatures of the air in the expander are substantially the same. Water from reservoir 2 is conveyed via line 14 to the expander and evaporated therein to form steam during or at the beginning of expansion of the air or at the beginning of or during steam expansion strokes separate from the air expansion strokes. If separate air and steam expansion strokes are used, they are preferably interspersed and most preferably alternate with each other. Combined air and steam expansion are preferred to separate air and steam expansion strokes.

The expanded air exiting the expander is conveyed via line 15 to heat exchanger 6 wherein it is cooled against compressed air. The expanded and cooled air is conveyed from the heat exchanger via line 16 to optional condenser 17 in which the gas is further cooled against air or water at substantially ambient temperature to cause some water to condense. The cooled gas and liquid are conveyed from the condenser via line 18 to optional water separator 19 in which the water is separated from the gas. Line 20 conveys separated water from the separator to water reservoir 2, from which it may be recirculated to the engine. Air exits the separator via line 21. The air in line 21 may be optionally separated into exhaust gas which is exhausted from the engine via line 22 and exhaust gas recirculation (EGR) gas via line 23 which conveys the EGR gas to line 1. Line 23 may optionally contain pumping means 24 for pumping EGR gas from line 21 to line 1.

Line 31 conveys compressed air from line 5 to compressor 32 wherein the air is compressed to a relatively higher pressure than in line 5. Line 33 conveys the more highly compressed air from compressor 32 to air storage tank 35. Line 33 contains a valve 34 to isolate the storage tank from line 5. The more highly compressed air is conveyed from the storage tank to line 5 via line 36, which contains isolation valve 37. Valves 34 and 37 are preferably normally closed valves such that when the when the engine is turned off, the compressed air in the storage tank 35 is isolated from line 5 and retained at high pressure. Any water that condenses in the air storage tank may be returned to a water reservoir via a return line and liquid level control valve or the like, not shown.

Upon startup, valve 37 is preferably opened to utilize the stored energy in the air storage tank to start or help start the engine.

Fuel is supplied from fuel tank 25 via line 26 to heat exchanger 6 wherein the fuel is heated and/or evaporated against the outlet gas from the expander. Line 27 conveys the fuel from heat exchanger 6 to lines 9 and 13. Line 28 may additionally convey water from water reservoir 2 to heat exchanger 6 wherein the water is injected into the fuel from line 26 and at least partially evaporates.

Expander 12 rotates shaft 38, and shaft 39 rotates compressor 4. Power is conveyed from shaft 38 to shaft 39 via CVT 40, wherein the CVT comprises two adjustable V-shaped pulleys and a belt or chain for dynamic adjustment of the E/C ratio.

Figure 2A:
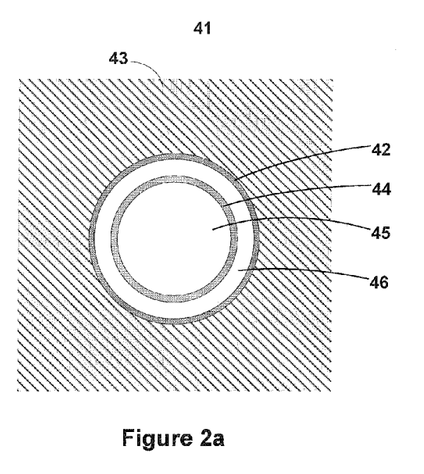
FIG. 2a is a transverse cross sectional view of a concentric fuel injector.

Referring to FIG. 2a, transverse cross sectional view of injector 41 is shown. The injector consists of outer tube 42 within wall section 43, inner tube 44 concentrically mounted within the outer tube, inner conduit 45 for injecting fuel through the engine wall 43, and annular conduit 46 for injecting shroud gas through the engine wall 43 into an engine cavity, not shown.

Figure 2B:
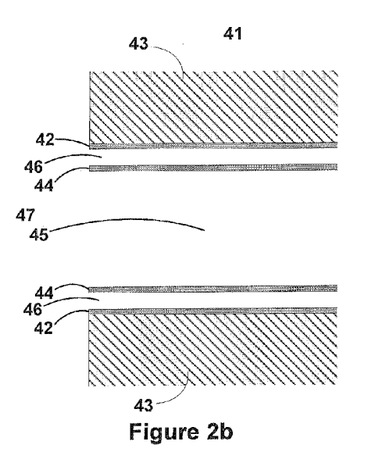
FIG. 2b is a longitudinal cross sectional view of a concentric fuel injector.

Referring to FIG. 2b, a longitudinal cross section of injector 41 is shown. The injector consists of outer tube 42 within wall section 43, inner tube 44 concentrically mounted within the outer tube, inner conduit 45, and annular conduit 46 for injecting fuel and shroud gas into engine cavity 47. The cavity may be the volume within the combustion chamber 8 of FIG. 1 or within the expander 12 of FIG. 1. Fuel is injected through conduit 45, and shroud gas containing substantially no combustion reactants such as fuel or oxidant is injected through annulus 46 into the cavity. The gas in the annulus shrouds or separates the fuel from the oxidant within the cavity to prevent combustion reactions from occurring in the immediate vicinity of the injector or engine wall. Outer tube 42 may either be inserted through the wall as shown or may consist of a simple bore through the wall in which the wall itself bounds the outside of the annulus and contains the shroud gas. The inner tube is dimpled to create standoffs between the inner tube and the outer tube to maintain a substantially uniform annular gap between the inner and outer tubes. The injector, sometimes referred to as a tuyere, is taught for the injection of oxygen into molten metal in many patents including U.S. Pat. Nos. 4,898,368 and 4,657,586.

Operation of the Invention

The peak air pressure within the engine can be adjusted by altering the volumetric compression ratio, the E/C ratio, or the pressure of the fuel or mixture of fuel and steam injected into the compressed air. These methods include the use of a CVT and, where cylinders are used, partial or full deactivation of compression or expansion cylinders. With a CVT the rate of rotation of a compressor relative to the rate of rotation of an expander is altered dynamically. This CVT method is preferred for centrifugal compression and for turbine expansion. In full deactivation of a compression or expander cylinder, the valves of the subject cylinder all remain closed throughout a complete cycle. In partial deactivation of a compression cylinder, the cylinder's intake valve is held open for longer portions of the beginning of the compression stroke or its exhaust valve is held open for longer periods at the end of the compression stroke to lower the compression ratio. In partial deactivation of expander cylinder, its intake valve is held open for longer portions of the beginning of the power stroke or its exhaust valve is held open for longer periods at the end of the power stroke to lower the expansion ratio. The compression ratio may also be increased by adding a liquid such as water to a positive displacement compressor along with the air, wherein the liquid also exits the compressor in liquid form along with the air.

Ignition is provided by a heat source within the expander or more preferably within the combustion chamber. The heat source may be an electrical resistance or spark type heater. The heat source is deactivated when the combustion chamber attains suitable temperature for stable catalytic or auto-ignition of the current fuel-oxidant mixture and velocity. Flame arrestors may be used in conjunction with the combustion chamber to prevent flashback.

In one embodiment, the oxidant is separated into two or more parallel streams between the compressor and expander such that the fuel is mixed with only a portion of the oxidant to promote combustion under more stoichiometric conditions than if the fuel were combined with all the oxidant. The parallel streams are then combined into one stream after the combustion chamber. Fuel injectors may inject fuel into only one of the parallel oxidant streams when the engine is cold or when fuels with narrow A/F flammability limits are used and may inject fuel into multiple oxidant streams when the engine is hot or conditions otherwise provide stable combustion for the given fuel and A/F ratio.

Water injection is initiated only after the establishment of a stable flame or upon the attainment of a prescribed temperature in the combustion chamber or in the expander outlet air. The embodiments which could potentially increase NOx emissions are preferred only if and when they are advantageous for establishing stable combustion.

The cross sectional area and volume of the combustion chamber are designed to provide velocity and residence time of the gases in the combustion chamber that are most suitable for attaining stable flame conditions.

The amount of water injected in or prior to compression for complete saturation of the compressed air with steam is preferred at all times in all positive displacement compressors and/or in any saturator between stages of compressors of any type.

Use of a heat exchanger to indirectly transfer heat from the expander outlet air to the compressor outlet air before the compressed air is combusted is preferred. Isothermal expansion is preferred only when the said heat exchanger is used. The oxidant heat exchanger may be bypassed by the compressed and exhaust gases during cold starts to reduce the pressure drop.

Fuel is injected in the combustion chamber at such rate as to attain a prescribed inlet temperature to the expander. To heat the engine and activate the combustion catalyst during a cold start the A/F ratio is between 80% and 150% of the stoichiometric ratio and no water injection is used. When the engine is hot and the compressed air is preheated by the heat exchanger, the flame temperature is diluted with excess air and/or water to a prescribed temperature.

The power of the engine is increased by a combination of at least one of increasing the steam injection in the expander, increasing the steam injection in the chamber, increasing the volumetric compression ratio, decreasing the A/F ratio towards a more stoichiometric ratio, or by consuming compressed air from the air storage tank while reducing the compression rate of the compressor relative to the rate of expansion.

The power of the engine is reduced by a combination of at least one of reducing the steam injection in the expander, reducing the steam injection in the chamber, increasing the A/F ratio with super-stoichiometric oxidant, reducing the volumetric compression ratio, decreasing the E/C ratio, or opening a valve in a line between the compressor and expander to vent air and lower the pressure of the chamber.

When the flame temperature increases, the S/A ratio is increased, the ratio of moles of combustion products to reactants increases, and/or the compression ratio is increased the E/C ratio is increased to maintain the prescribed expander outlet pressure. When the flame temperature decreases, the S/A ratio is reduced, the ratio of moles of combustion products to reactants decreases, and/or the compression ratio is decreased the E/C ratio is reduced to maintain the prescribed expander outlet pressure.

If multiple compressors are used, they are preferably combined in series to each other to provide staged compression. Multiple expanders may be used in series with combustion between the stages of expansion to reheat the air where isothermal expansion within an expander is not practiced as may particularly be the case with turbines.

The rates and timing of air compression, fuel addition and water addition are preferably controlled by a computer or the like, preferably using closed loop control with input signals from at least some of the compression outlet pressure, the compression outlet temperature, the expansion outlet pressure, the expansion outlet temperature, the A/F ratio, the combustion chamber temperature, the chamber pressure, the power demand, the rpm of the engine, the water injector pressure, the fuel injector pressure, the ambient air temperature, the ambient air humidity, the air storage pressure, and the fuel type or mixture.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner. Thus, scope of the invention is indicated by the following claims rather than by the foregoing description.

What is claimed is:

1. An internal combustion engine having a peak temperature comprising:
    a. a positive displacement compressor for compressing inlet air,
    b. a heat exchanger for heating the compressed air exiting the positive displacement compressor against exhaust exiting a positive displacement expander,
    c. a first injector;
    d. a combustion chamber, the first injector injecting fuel into the combustion chamber which combusts the fuel with the heated compressed air, the combustion chamber being separate from the positive displacement compressor and the positive displacement expander, the positive displacement expander expanding the combusted air, the positive displacement expander being separate from the positive displacement compressor,
    e. a second injector which injects fuel into the positive displacement expander to combust the combusted air and fuel in the positive displacement expander to produce the exhaust, and
    f. a controller which modulates the peak temperature to be less than a prescribed temperature by dynamically adjusting at least one of a compression ratio, an expansion ratio, and an E/C ratio.

2. The internal combustion engine of claim 1 further comprising a third injector which injects and evaporates water in the air in the engine.

3. The internal combustion engine of claim 2 wherein an S/A ratio is dynamically adjusted.

4. The internal combustion engine of claim 1 further comprising an air storage device which stores compressed air from the compressor and an isolator which selectively isolates the air in the air storage device from the compressor and the expander.

5. The internal combustion engine of claim 4 further comprising a second positive displacement compressor which compresses the air in the air storage device to a pressure higher than an outlet pressure of the compressor.

6. The internal combustion engine of claim 1 further comprising a vaporizing liquid fuel device which vaporizes liquid fuel and humidifies the resultant gaseous fuel with water vapor by heat exchange against the expanded air and a device which subsequently combusts the humidified fuel in the engine.

7. The internal combustion engine of claim 1 wherein the first injector comprises first and second concentric tubes in which a fuel is injected into an enclosure within the combustion chamber through the inner tube and a second fluid substantially free of fuel and free oxygen is injected into the expander through an annulus between the first and second tubes.

8. The internal combustion engine of claim 1 wherein the peak temperature is modulated to a temperature compatible with the materials of the engine.

9. The internal combustion engine of claim 8 wherein the peak temperature is modulated by adjusting the S/A ratio.

10. The internal combustion engine of claim 1 wherein the peak temperature is modulated to less than a prescribed temperature.

11. The internal combustion engine of claim 10 wherein the prescribed temperature is about 900° C.

12. The internal combustion engine of claim 1 wherein the compressor is a positive displacement compressor.

13. The internal combustion engine of claim 1 further comprising a transmission operatively coupled to the positive displacement compressor and to the positive displacement expander, the transmission being adapted to alter a first rate of rotation of the positive displacement compressor relative to a second rate of rotation of the positive displacement expander.

14. The internal combustion engine of claim 13 wherein the transmission is a continuously variable transmission (CVT).

15. A method for operating an internal combustion engine having a peak temperature, the method comprising the steps of:
- a. compressing inlet air with a positive displacement compressor,
- b. heating the compressed air exiting the compressor against exhaust exiting a positive displacement expander,
- c. injecting fuel into a combustion chamber with a first injector to combust the fuel with the heated compressed air, the combustion chamber being separate from the positive displacement expander, the positive displacement expander expanding the combusted air, the positive displacement expander being separate from the positive displacement compressor,
- d. injecting fuel into the positive displacement expander with a second injector to combust the combusted air and fuel in the positive displacement expander to produce the exhaust, and
- e. dynamically adjusting at least one of a compression ratio, an expansion ratio, and an E/C ratio to modulate the peak temperature to be less than a prescribed temperature.

16. The method of claim 15 wherein water is injected into and evaporated in the air in the engine.

17. The method of claim 15 wherein an S/A ratio is dynamically adjusted.

18. The method of claim 15 wherein compressed air from the compressor is stored in an air storage device and isolated from the compressor and the expander.

19. The method of claim 18 wherein air stored in the air storage device is compressed in a second compressor to a pressure higher than an outlet pressure of the compressor.

20. The method of claim 15 wherein liquid fuel is vaporized and humidified with water vapor by heat exchange against the expanded air and the humidified fuel is subsequently combusted in the engine.

21. The method of claim 15 wherein the prescribed temperature is about 900° C.

22. The method of claim 15 wherein the peak temperature is modulated by adjusting an S/A ratio.

23. The method of claim 15 further comprising operatively coupling a transmission to the positive displacement compressor and to the positive displacement expander, the transmission being adapted to alter a first rate of rotation of the positive displacement compressor relative to a second rate of rotation of the positive displacement expander.

24. The method of claim 23 further comprising employing a continuously variable transmission (CVT) as the transmission.

\* \* \* \* \*